US011169577B2

(12) United States Patent
Angelevski et al.

(10) Patent No.: US 11,169,577 B2
(45) Date of Patent: Nov. 9, 2021

(54) SENSING RELATIVE ORIENTATION OF COMPUTING DEVICE PORTIONS

(71) Applicant: Microsoft Technology Licensing, LLC, Redmond, WA (US)

(72) Inventors: Stefan Angelevski, Bellevue, WA (US); Dmitry N. Lukyantsev, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 81 days.

(21) Appl. No.: 15/945,631

(22) Filed: Apr. 4, 2018

(65) Prior Publication Data

US 2019/0310720 A1    Oct. 10, 2019

(51) Int. Cl.
*G06F 1/16*      (2006.01)
*G06F 3/0346*   (2013.01)
(Continued)

(52) U.S. Cl.
CPC .......... *G06F 1/1677* (2013.01); *G06F 3/0346* (2013.01); *G06F 3/1423* (2013.01);
(Continued)

(58) Field of Classification Search
None
See application file for complete search history.

(56) References Cited

U.S. PATENT DOCUMENTS 9,389,692 B2    7/2016  McRae
9,454,245 B2    9/2016  Kulik
(Continued)

FOREIGN PATENT DOCUMENTS

TW          I584157 B      5/2017

OTHER PUBLICATIONS

"Introduction to IMU", Retrieved from: <<http://students.iitk.ac.in/roboclub/lectures/IMU.pdf>>, Retrieved on: Jan. 29, 2018, 15 Pages.
(Continued)

*Primary Examiner* — Brian M Butcher
(74) *Attorney, Agent, or Firm* — Alleman Hall Creasman & Tuttle LLP

(57) ABSTRACT

Examples are disclosed that relate to determining the relative orientation of computing device portions that are rotatable relative to one another. One example provides a computing device comprising a first portion comprising a first three-dimensional orientation sensor system, a second portion comprising a second three-dimensional orientation sensor system, the second portion being rotatable relative to the first portion, a logic machine, and a storage machine holding instructions executable by the logic machine to receive data from the first three-dimensional orientation sensor system indicating a three-dimensional orientation of the first portion, receive data from the second three-dimensional orientation sensor system indicating a three-dimensional orientation of the second portion, determine a relative orientation between the first portion and the second portion based on the three-dimensional orientation of the first portion and the three-dimensional orientation of the second portion, and adjust a function of the computing device based on the relative orientation.

16 Claims, 6 Drawing Sheets

(51) Int. Cl.
*G06F 3/14* (2006.01)
*H04M 1/02* (2006.01)
*G06F 1/3234* (2019.01)
*H04M 1/72454* (2021.01)

(52) U.S. Cl.
CPC ......... *H04M 1/0243* (2013.01); *G06F 1/1616* (2013.01); *G06F 1/1618* (2013.01); *G06F 1/3265* (2013.01); *H04M 1/0214* (2013.01); *H04M 1/72454* (2021.01)

(56) References Cited

U.S. PATENT DOCUMENTS

| | | |
|---|---|---|
| 10,204,592 B1 * | 2/2019 | Trim .................... H04N 1/6075 |
| 2011/0161042 A1 | 6/2011 | Krancher et al. |
| 2014/0267006 A1 | 9/2014 | Raffa et al. |
| 2015/0354951 A1 | 12/2015 | Ali et al. |
| 2016/0048363 A1 | 2/2016 | North et al. |
| 2016/0360997 A1 | 12/2016 | Yadav et al. |
| 2017/0003751 A1 | 1/2017 | Micali et al. |
| 2017/0010657 A1 | 1/2017 | Schneider |
| 2017/0075640 A1 | 3/2017 | Chun et al. |

OTHER PUBLICATIONS

"International Search Report & Written Opinion Issued in PCT Application No. PCT/US2019/023797", dated Jun. 26, 2019, 14 Pages.

* cited by examiner

SENSING RELATIVE ORIENTATION OF COMPUTING DEVICE PORTIONS

BACKGROUND

Many devices include different portions connected by a hinge or other mechanism that allows the portions to be reoriented relative to one another. For example, a laptop computing device may include a display portion that can be rotated relative to a keyboard portion.

SUMMARY

Examples are disclosed herein that relate to determining the relative orientation of portions of computing devices that are rotatable relative to one another. One example provides a computing device comprising a first portion comprising a first three-dimensional orientation sensor system, a second portion comprising a second three-dimensional orientation sensor system, the second portion being rotatable relative to the first portion, a logic machine, and a storage machine holding instructions executable by the logic machine to receive data from the first three-dimensional orientation sensor system indicating a three-dimensional orientation of the first portion, receive data from the second three-dimensional orientation sensor system indicating a three-dimensional orientation of the second portion, determine a relative orientation between the first portion and the second portion based on the three-dimensional orientation of the first portion and the three-dimensional orientation of the second portion, and adjust a function of the computing device based on the relative orientation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, some computing devices include multiple portions that can be reoriented relative to one another. For example, a laptop computing device may include a display portion that can be rotated via a hinge relative to a keyboard portion. As another example, a mobile phone may include multiple portions that can be closed in a clamshell configuration.

Some computing devices may be configured to sense the relative orientation between the portions in at least some positions. For example, a laptop computer may include a sensor that senses whether the computer is in an open or closed state. However, such sensors generally provide information only on the open/closed state, and do not provide any other information on the relative orientation of the two portions.

To sense other orientational states, a computing device may include a sensor system mounted on a mechanical hinge connecting the portions. However, the physical placement of the sensor system on the hinge may be impractical. Alternatively or additionally, a computing device may include accelerometers respectively housed within each portion. Such a configuration may allow a relative orientation to be determined based upon movements sensed by the accelerometers. However, in some orientations, the computing device may be unable to distinguish the respective orientations of the individual portions, for example, when the respective accelerometers are oriented such that the gravity vector of each does not change when the portions are rotated (e.g., when both gravity vectors are directed along a hinge connecting the portions). In such situations, a computing device may not respond as intended to rotational movement between the portions.

Thus, examples are disclosed herein that relate to sensing the relative orientation between portions of a computing device in manners that may avoid such issues. One example provides a computing device comprising a first portion and a second portion, where the first portion comprises a first three-dimensional orientation sensor system, and the second portion comprises a second three-dimensional orientation sensor system. The computing device receives data from the first and second three-dimensional orientation sensing systems, determines a relative orientation between the first and second portions based on the data from the three-dimensional orientation sensing systems, and adjusts a function of the computing device based on the relative orientation. By using a three-dimensional orientation sensing system in each portion of the computing device, the relative orientation of the computing device portions can be determined in all possible device orientations, thereby improving computing device performance over systems in which the relative orientation of a first portion and a second portion cannot be sensed in all device orientations.

Figure 1A:
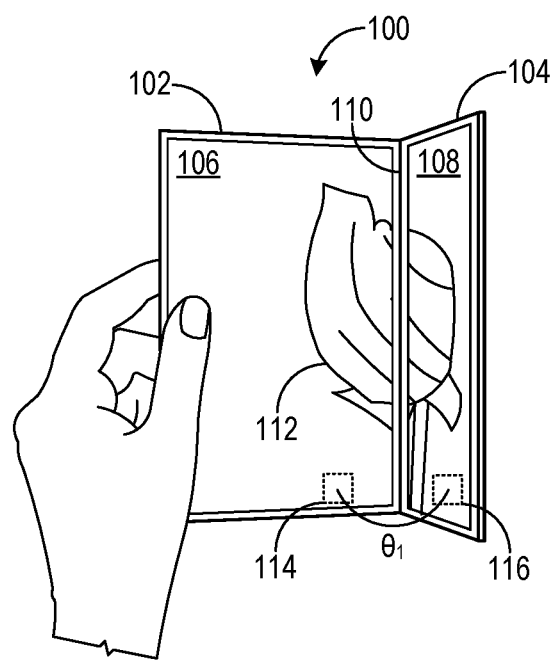
FIGS. 1A-1B show orientation states of an example computing device.
Figure 1B:
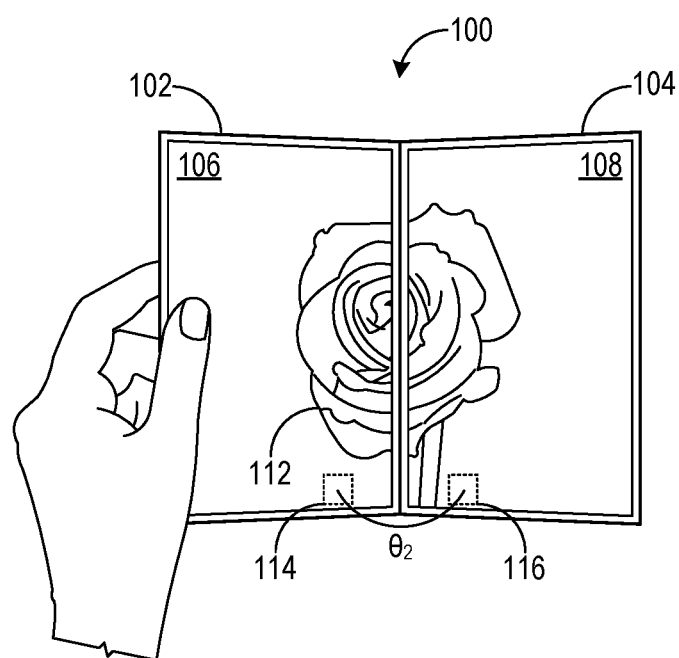

FIGS. 1A-1B show respective states of an example computing device 100. Computing device 100 includes a first portion 102 and a second portion 104 that respectively include a first display 106 and a second display 108. A hinge 110 arranged between first and second portions 102 and 104 enables the relative orientation between the portions and their displays to be adjusted by rotating one or both portions about the hinge. This relative orientation is represented in FIGS. 1A-1B by a variable angle θ measured between the surfaces of first and second portions 102 and 104. In the state shown in FIG. 1A, first and second portions 102 and 104 form an acute angle $θ_1$, whereas in the state shown in FIG. 1B the first and second portions are further rotated away from each other to form an obtuse angle $θ_2$. First and second portions 102 and 104 may be rotatable throughout any suitable range of angles.

Computing device 100 may be configured to determine the relative orientation between first and second portions 102 and 104, and to adjust a function of the computing device based on the relative orientation. In the example depicted in FIGS. 1A and 1B, computing device 100 outputs via first and second displays 106 and 108 an image of a rose 112 whose level of bloom increases as angle θ between first and second portions 102 and 104 increases. As seen in FIG. 1A, rose 112 is shown in a relatively unbloomed state based on the acute angle $θ_1$, whereas in FIG. 1B the rose is shown in a relatively bloomed state based on the obtuse angle $θ_2$. Computing device 100 may continuously animate rose 112 as progressively blooming as first and second portions 102 and 104 are rotated farther apart, and likewise may animate the rose as progressively de-blooming as the portions are brought closer together.

Figure 2:
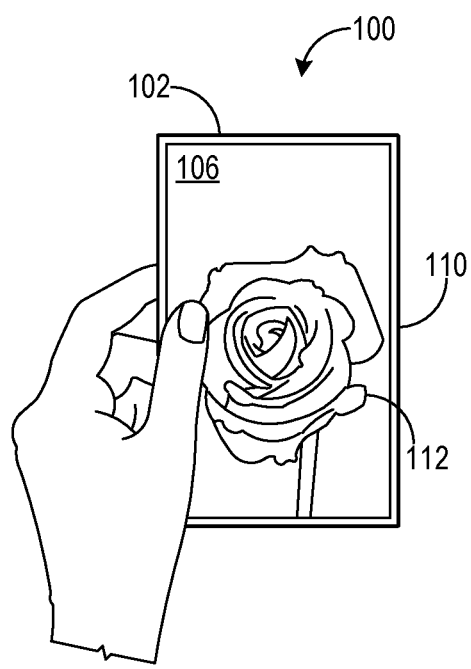
FIG. 2 illustrates the adjustment of a function of the computing device of FIGS. 1A-1B based upon a relative orientation of a first portion and a second portion of the computing device.

FIG. 2 shows another example illustrating how a function of computing device 100 may be adjusted based on the relative orientation between first and second portions 102 and 104. In this example, second portion 104 is folded via hinge 110 behind first portion 102. From the perspective of a user of computing device 100, second display 108 is imperceptible. In response, computing device 100 moves the image of rose 112 that was previously displayed across both first display 106 and second display 108 fully onto first display 106. Further, computing device 100 may cease displaying images on second display 108 in this orientation, thereby reducing power consumption without adversely affecting the user experience.

It will be understood that the examples of FIGS. 1A-1B are illustrative and not limiting, and that computing device 100 may be configured to adjust any other suitable functionality based upon the relative orientation of first portion 102 and second portion 104. Other examples of functions that computing device 100 may adjust based on the relative orientation of first and second portions 102 and 104 include adjusting rendering of graphical content for first display 106 and/or second display 108, adjusting display brightness, adjusting color temperature, etc. Further, computing device 100 may include or otherwise couple to other devices that may be controlled based on the relative orientation. For example, computing device 100 may adjust an audio output (e.g., volume, tone, activate/deactivate individual speakers) based on the relative orientation. Yet other examples of adjustments that may be made based on the relative orientation between first and second portions 102 and 104 include adjusting how a battery of computing device 100 is charged, adjusting performance characteristics of the computing device (e.g., throttling operation of a central processing unit and/or microcontroller of the computing device), and/or adjusting the operation of the computing device based on thermal constraints.

In some examples, first and second portions 102 and 104 may be configured as rigid structures that rotate relative to one another via hinge 110. In other examples, computing device 100 may include one or more flexible portions that can be moved relative to one another, via a hinge and/or flexing of one or more of the flexible portions. In some such examples, a three-dimensional orientation sensor system may sense an orientation of a region of a flexible device portion in which the sensor system is located. In other such examples, a flexible portion may include two or more three-dimensional orientation sensor systems. In such examples, the outputs may be combined (e.g., averaged) to determine an overall three-dimensional orientation of the flexible portion. Further, while shown in FIGS. 1A-1B as including first and second displays 106 and 108, computing device 100 may include other numbers of displays, or no displays at all. For example, computing device 100 may instead include a single display confined to one of first and second portions 102 and 104, and a keyboard on the other. As another example, computing device 100 may include a single flexible display (e.g., a flexible organic light-emitting diode display) spanning both first and second portions 102 and 104. Computing device 100 itself may assume any suitable form, including but not limited to various mobile devices (e.g., foldable smart phone, tablet, laptop).

As mentioned above, first portion 102 includes a first three-dimensional orientation sensor system 114 configured to provide output indicative of a three-dimensional orientation of the first portion, and second portion 104 includes a second three-dimensional orientation sensor system 116 configured to provide output indicative of a three-dimensional orientation of the second portion. In some examples, first and second orientation systems 114 and 116 each includes an accelerometer and a gyroscope, while in other examples the first and second orientation systems 114 and 116 each includes an accelerometer, a gyroscope, and a magnetometer. As described in further detail below, the output produced by first and second orientation systems 114 and 116 generally indicate a three-dimensional orientation of first and second portions 102 and 104, respectively. For example, first and second orientation systems 114 and 116 may each indicate a respective degree of rotation about three mutually orthogonal coordinate axes, in addition to a respective degree of translation about three mutually orthogonal coordinate axes.

Any suitable computational method may be used to determine the relative orientation of the first and second portions 104. As one example, first orientation system 114 outputs data indicating the three-dimensional orientation of first portion 102 in the form of a quaternion A comprising elements ($x_A$, $y_A$, $z_A$, $w_A$), and second orientation system 116 outputs data indicating the three-dimensional orientation of second portion 104 in the form of a quaternion B comprising elements ($x_B$, $y_B$, $z_B$, $w_B$). Quaternions A and B may be unit quaternions, for example. A third quaternion C comprising elements ($x_C$, $y_C$, $z_C$, $w_C$) may be computed as C=B*inverse (A), such that C represents the relative orientation between quaternions A and B, and thus between first and second portions 102 and 104. The relative orientation between first and second portions 102 and 104 may then be determined based on the third quaternion C as a relative angle θ between the portions by computing θ=arccos($w_C$).

In other examples, first and second orientation systems 114 and 116 may output respective Euler angles respectively indicating the three-dimensional orientation of first and second portions 102 and 104. The computation of the relative orientation between first and second portions 102 and 104 using the Euler angles produced by first and second orientation systems 114 and 116 will be understood from the above example using quaternions and from known properties of Euler angle mathematics. Any suitable logic device may be used to compute the relative orientation between first and second portions 102 and 104, including but not limited to a processor and a system-on-a-chip (SoC).

Figure 3A:
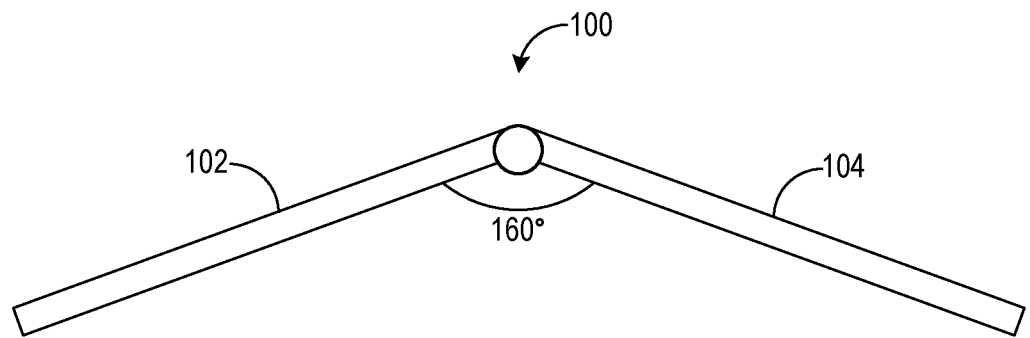
FIGS. 3A-3B illustrate the determination of a sign corresponding to the orientation of the computing device of FIGS. 1A-1B.
Figure 3B:
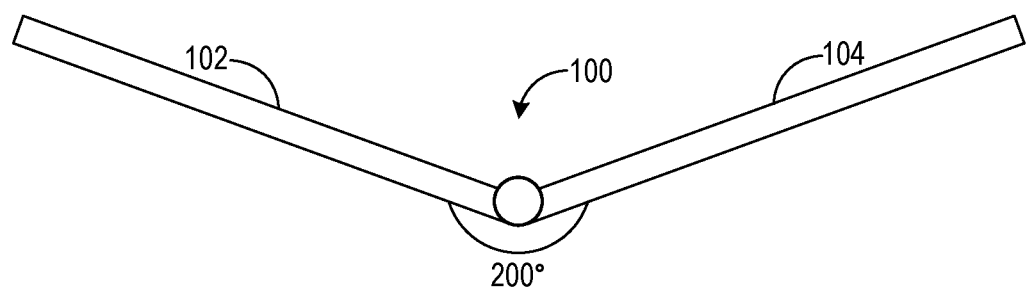

In some scenarios, there may be some uncertainty in the determined relative orientation between first and second portions 102 and 104. FIGS. 3A and 3B illustrate one such scenario. In FIG. 3A, first and second portions 102 and 104 are separated by 160 degrees, while in FIG. 3B, first and portions 102 are 104 are separated by 200 degrees. In these examples, the arccos function may produce the same output from orientation sensor system data for the 160 degree relative angle as for orientation sensor system data for the 200 degree relative angle. To disambiguate these relative orientations, computing device 100 may be configured to determine a sign (+/−) by determining an Euler angle associated with the relative orientation between the portions. With reference to the example presented above in which the relative orientation is computed based on quaternions A, B, and C, the Euler angle may be determined based on quaternion C using known quaternion-to-Euler angle conversion techniques. The Euler angle may yield one of the two potential signs, thereby indicating whether the angle is less than or greater than 180 degrees.

Figure 4A:
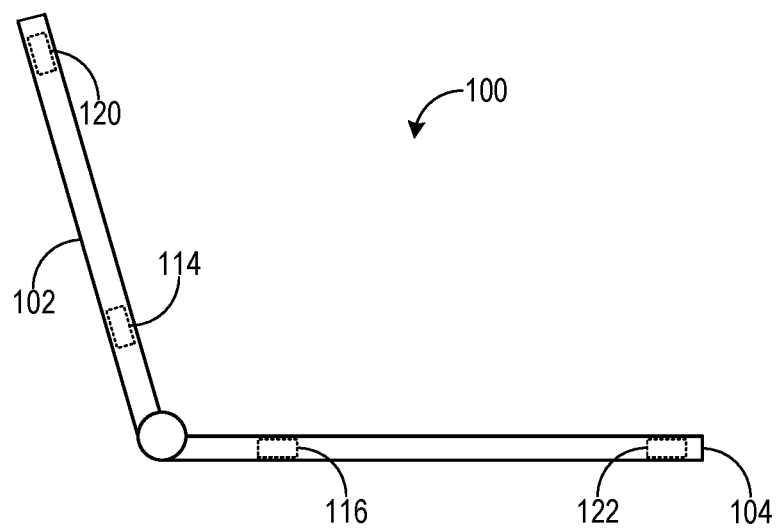
FIGS. 4A-4B illustrate the determination of an offset between sensor data from sensor systems in two portions of the computing device of FIGS. 1A-1B.
Figure 4B:
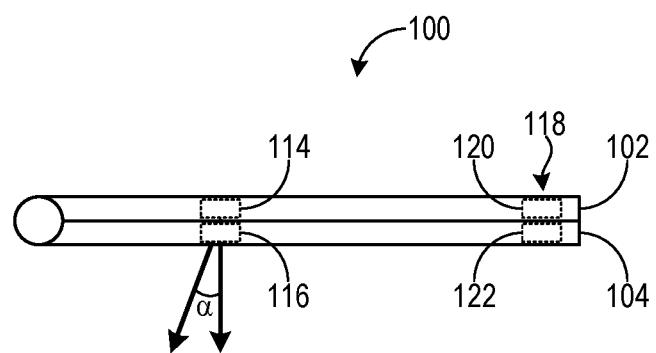

Under some conditions, first and second orientation sensor systems 114 and 116 may produce differing outputs when substantially the same outputs would be expected. FIGS. 4A-4B illustrate one such condition. In this example, each figure shows a side view of a respective state of computing device 100. In FIG. 4A, computing device 100 is in an open configuration, with first portion 102 being separated from second portion 104 by a relatively large angle (e.g., by 110 degrees). In this condition, differing outputs between sensor system 114 and sensor system 116 would be expected. In FIG. 4B, computing device 100 is in a closed configuration, with first and second portions 102 and 104 in a face-to-face configuration. In the closed configuration, the orientation of the first portion 102 is substantially equal to that of second portion 104. In this configuration, outputs from first and second orientation sensor systems 114 and 116 would be expected to be substantially equal, but the outputs may actually differ somewhat in practice for a variety of reasons, including but not limited to manufacturing tolerance and physical changes to computing device 100 throughout its life of use. FIG. 4B represents differing outputs from first and second orientation sensor systems 114 and 116 in the form of vectors D and E, which respectively indicate the rotational orientation of first and second portions 102 and 104 relative to the gravity vector. As shown therein, vectors D and E are separated by an angle α.

To calibrate for such angular displacement, the computing device 100 may be configured to determine the offset between data from first orientation sensor system 114 and data from second orientation sensor system 116 and apply the offset to relative orientation computations. The offset may be determined when it is known that first and second portions 102 and 104 are in a predetermined relative orientation, such as the closed configuration of in FIG. 4B. In this example, computing device 100 includes a sensor 118 configured to sense when first and second portions 102 and 104 are in the closed configuration. In this example, sensor 118 takes the form of a Hall effect sensor 122 configured to detect motion of a magnet 120. In other examples, the sensor may comprise an optical sensor, contact switch, or other suitable sensing mechanism. With reference to the example above in which the relative orientation is computed based on quaternions A, B, and C, the offset may be determined as a quaternion D by solving for D in the relation B=A+D in the predetermined relative orientation. Quaternion D may then be used in computing quaternion C via the relation C=B*inverse(A+D) (such that C represents the distance between B and (A+D)). Thus, determining the relative orientation may include utilizing the offset when determining the third quaternion C.

In some examples, the offset between the outputs from first and second orientation sensor systems 114 and 116 may be redetermined periodically, such as each time the first and second portions 102 and 104 are sensed as being in the predetermined relative orientation. Alternatively or additionally, a predetermined offset determined during manufacture of computing device 100 may be used. The predetermined offset may be determined specifically for computing device 100, or generally for all instances of a device model (e.g., for a stock keeping unit).

Figure 5:
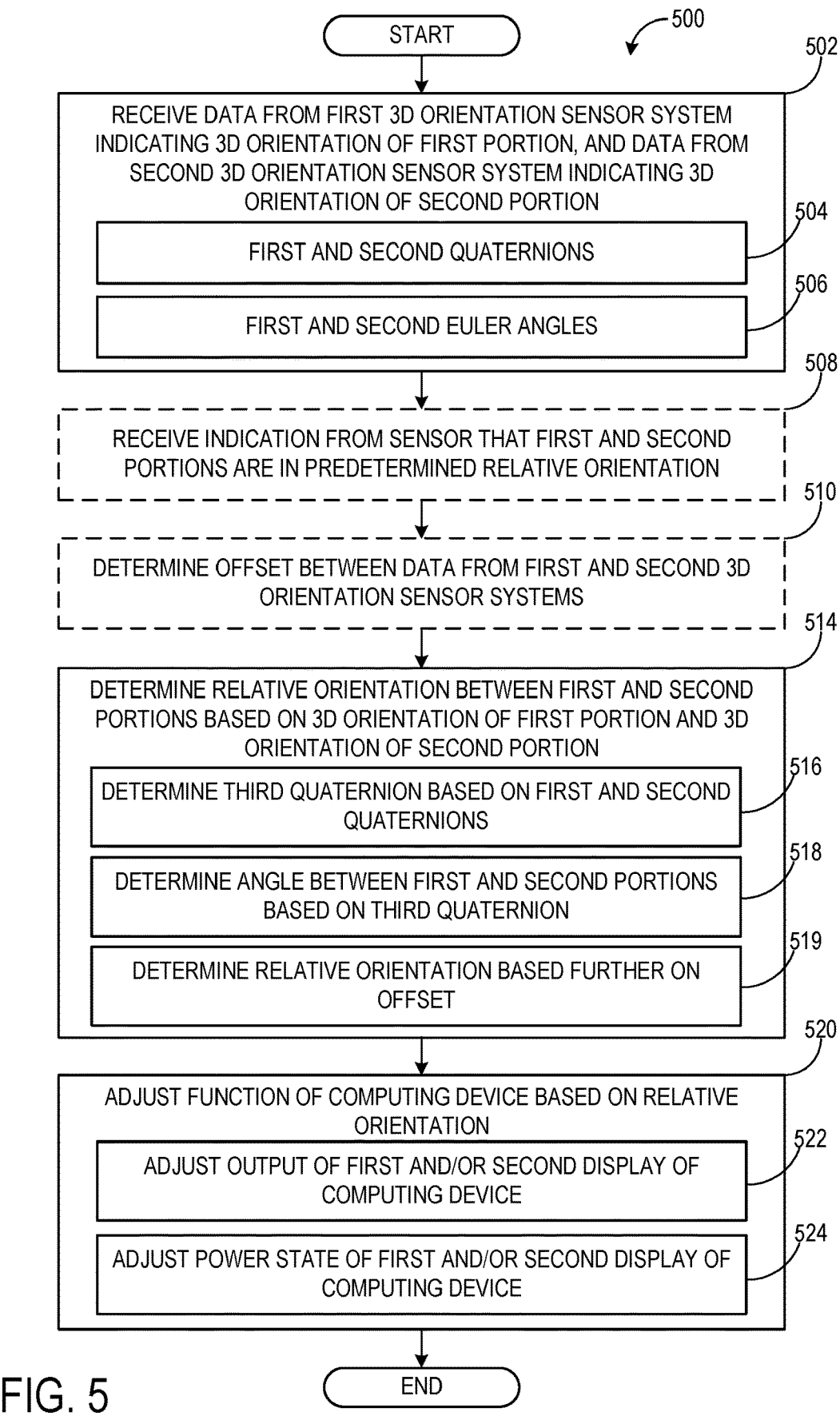
FIG. 5 shows a flowchart illustrating an example method of determining a relative orientation between first and second portions of a computing device.

FIG. 5 shows a flow diagram illustrating an example method 500 of determining a relative orientation between first and second portions of a computing device. Method 500 may be implemented on computing device 100, for example.

At 502, method 500 includes receiving data from a first three-dimensional orientation sensor system of the computing device, wherein the data indicates a three-dimensional orientation of a first portion of the computing device. Process 502 also comprises receiving data from a second three-dimensional orientation sensor system of the computing device indicating a three-dimensional orientation of a second portion of the computing device, the second portion being rotatable relative to the first portion. As indicated at 504, the data from the first three-dimensional orientation sensor system may include a first quaternion, and the data from the second three-dimensional orientation sensor system may include a second quaternion. Alternatively or additionally, as indicated at 506, the data from the first three-dimensional orientation sensor system may include a first Euler angle, and the data from the second three-dimensional orientation sensor system may include a second Euler angle.

At 508, method 500 may optionally include receiving an indication from a sensor of the computing device that the first and second portions are in a predetermined relative orientation. In the case of a clamshell-type computing device (e.g. a laptop or other mobile device), the predetermined relative orientation may comprise a closed configuration, for example.

At 510, method 500 may optionally include determining an offset between data from the first three-dimensional orientation sensor system and data from the second three-dimensional orientation sensor system when in the predetermined relative orientation. In some examples, the offset may be redetermined for each indication received from the sensor.

At 514, method 500 includes determining a relative orientation between the first portion and the second portion based on the three-dimensional orientation of the first portion and the three-dimensional orientation of the second portion. Determining the relative orientation may include, at 516, determining a third quaternion based on the first and second quaternions. As indicated at 518, determining the relative orientation may include determining an angle between the first and second portions based on the third quaternion. Further, as indicated at 519, the relative orientation may be determined based on the offset optionally determined at 510.

At 520, method 500 includes adjusting a function of the computing device based on the relative orientation. Adjusting the function may include, at 522, adjusting output of one or both of a first display and a second display of the computing device. Adjusting the function alternatively or additionally may include, at 524, adjusting a power state of one or both of the first display and the second display. Any other suitable function of the computing device alternatively or additionally may be adjusted based on the relative orientation, including but not limited to adjusting the rendering of graphical content, adjusting a brightness of a display, adjusting one or more color characteristics of a display, and/or adjusting audio output from the computing device. Other examples of adjustments that may be made based on the relative orientation include adjusting the performance (e.g., throttling) of a central processing unit and/or a microcontroller, and adjusting how a battery of the computing device is charged. These and other potential adjustments may be made in view of any suitable consideration, such as desired computing device performance, battery performance, and thermal output of the computing device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
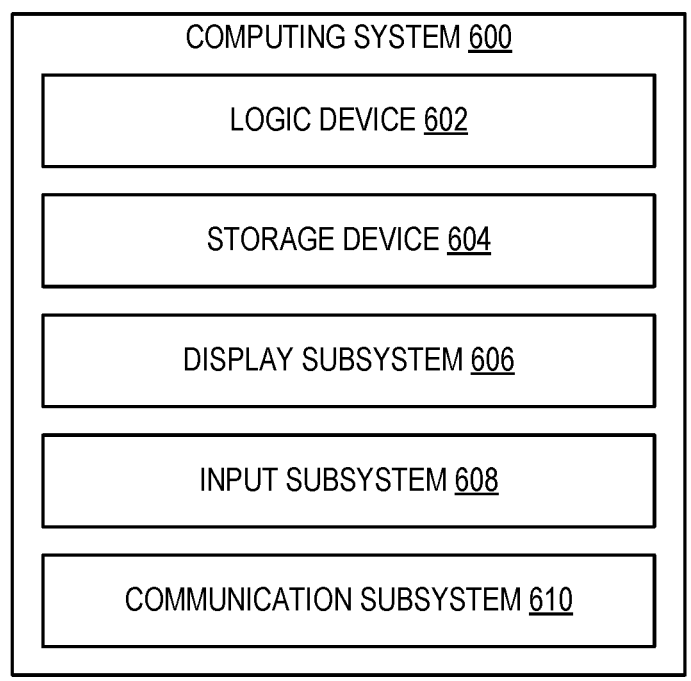
FIG. 6 shows a block diagram of another example computing device.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 600 implemented to perform a particular function. In some cases, a program may be instantiated via logic machine 602 executing instructions held by storage machine 604. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Another example provides a computing device comprising a first portion comprising a first three-dimensional orientation sensor system, a second portion comprising a second three-dimensional orientation sensor system, the second portion being rotatable relative to the first portion, a logic machine, and a storage machine holding instructions executable by the logic machine to receive data from the first three-dimensional orientation sensor system indicating a three-dimensional orientation of the first portion, and data from the second three-dimensional orientation sensor system indicating a three-dimensional orientation of the second portion, determine a relative orientation between the first portion and the second portion based on the three-dimensional orientation of the first portion and the three-dimensional orientation of the second portion, and adjust a function of the computing device based on the relative orientation. In such an example, the first portion alternatively or additionally may comprise a first display, and the second portion alternatively or additionally may comprise a second display. In such an example, the instructions executable to adjust the function of the computing device may be executable to adjust an output of one or both of the first display and the second display based on the relative orientation. In such an example, the instructions executable to adjust the function of the computing device alternatively or additionally may be executable to adjust a power state of one or both of the first display and the second display based on the relative orientation. In such an example, the first three-dimensional orientation sensor system and the second three-dimensional orientation sensor system each may include an accelerometer and a gyroscope. In such an example, the first three-dimensional orientation sensor system and the second three-dimensional orientation sensor system each may alternatively or additionally include a magnetometer. In such an example, the computing device alternatively or additionally may comprise a sensor configured to output an indication that the first portion and the second portion are in a predetermined relative orientation. In such an example, the instructions alternatively or additionally may be executable to, responsive to receiving the indication from the sensor, determine an offset between the data from the first three-dimensional orientation sensor system and the data from the second three-dimensional orientation sensor system, wherein the relative orientation may be determined based further on the offset. In such an example, the instructions alternatively or additionally may be executable to determine a sign for the relative orientation. In such an example, the predetermined relative orientation may comprise a closed configuration. In such an example, the data indicating the three-dimensional orientation of the first portion may include a first Euler angle, and the data indicating the three-dimensional orientation of the second portion may include a second Euler angle. In such an example, the data indicating the three-dimensional orientation of the first portion alternatively or additionally may include a first quaternion, and the data indicating the three-dimensional orientation of the second portion alternatively or additionally may include a second quaternion. In such an example, the instructions executable to determine the relative orientation alternatively or additionally may be executable to determine a third quaternion based on the first quaternion and the second quaternion. In such an example, determining the relative orientation alternatively or additionally may include utilizing an offset when determining the third quaternion.

Another example provides, on a computing device, a method, comprising receiving data from a first three-dimensional orientation sensor system indicating a three-dimensional orientation of a first portion of the computing device, receiving data from a second three-dimensional orientation sensor system indicating a three-dimensional orientation of a second portion of the computing device, the second portion being rotatable relative to the first portion, determining a relative orientation between the first portion and the second portion based on the three-dimensional orientation of the first portion and the three-dimensional orientation of the second portion, and adjusting a function of the computing device based on the relative orientation. In such an example, the first portion may comprise a first display, the second portion may comprise a second display, and adjusting the function of the computing device may include adjusting an output of one or both of the first display and the second display based on the relative orientation. In such an example, the method alternatively or additionally may comprise determining an offset between the data from the first three-dimensional orientation sensor system and the data from the second three-dimensional orientation sensor system, and the relative orientation alternatively or additionally may be determined based on the offset. In such an example, the data indicating the three-dimensional orientation of the first portion may include a first quaternion and the data indicating the three-dimensional orientation of the second portion may include a second quaternion, determining the relative orientation alternatively or additionally may include determining a third quaternion based on the first quaternion and the second quaternion, and determining the relative orientation alternatively or additionally may include determining an angle between the first portion and the second portion based on the third quaternion.

Another example provides a computing device, comprising a first portion comprising a first display and a first three-dimensional orientation sensor system, a second portion comprising a second display and a second three-dimensional orientation sensor system, the second portion being rotatable relative to the first portion, a logic machine, and a storage machine holding instructions executable by the logic machine to receive from the first three-dimensional orientation sensor system data indicating a three-dimensional orientation of the first portion, and from the second three-dimensional orientation sensor system data indicating a three-dimensional orientation of the second portion, determine a relative orientation between the first portion and the second portion based on the three-dimensional orientation of the first portion and the three-dimensional orientation of the second portion, and adjust an output of one or both of the first display and the second display based on the relative orientation. In such an example, the instructions alternatively or additionally may be executable to determine an offset between the data from the first three-dimensional orientation sensor system and the data from the second three-dimensional orientation sensor system, and the relative orientation alternatively or additionally may be determined based further on the offset.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
   a first portion comprising a first three-dimensional orientation sensor system;
   a second portion comprising a second three-dimensional orientation sensor system, the second portion being rotatable relative to the first portion;
   a sensor configured to output an indication that the first portion and the second portion are in a predetermined relative orientation;
   a logic machine; and
   a storage machine holding instructions executable by the logic machine to
      receive data from the first three-dimensional orientation sensor system indicating a three-dimensional orientation of the first portion, and data from the second three-dimensional orientation sensor system indicating a three-dimensional orientation of the second portion;
      receive, from the sensor configured to output the indication that the first portion and the second portion are in the predetermined relative orientation, the indication;
      responsive to receiving the indication from the sensor, determine a calibration offset between the data from the first three-dimensional orientation sensor system and the data from the second three-dimensional orientation sensor system;
      determine a relative orientation between the first portion and the second portion based on an offset three-dimensional orientation of the first portion and the three-dimensional orientation of the second portion, the offset three-dimensional orientation of the first portion determined from the three-dimensional orientation of the first portion and the calibration offset; and
      adjust a function of the computing device based on the relative orientation.

2. The computing device of claim 1, wherein the first portion comprises a first display, and wherein the second portion comprises a second display.

3. The computing device of claim 2, wherein the instructions executable to adjust the function of the computing device are executable to adjust an output of one or both of the first display and the second display based on the relative orientation.

4. The computing device of claim 2, wherein the instructions executable to adjust the function of the computing device are executable to adjust a power state of one or both of the first display and the second display based on the relative orientation.

5. The computing device of claim 1, wherein the first three-dimensional orientation sensor system and the second three-dimensional orientation sensor system each includes an accelerometer and a gyroscope.

6. The computing device of claim 5, wherein the first three-dimensional orientation sensor system and the second three-dimensional orientation sensor system each includes a magnetometer.

7. The computing device of claim 1, wherein the instructions are further executable to determine a sign for the relative orientation.

8. The computing device of claim 1, wherein the predetermined relative orientation comprises a closed configuration.

9. The computing device of claim 1, wherein the data indicating the three-dimensional orientation of the first portion includes a first Euler angle, and wherein the data indicating the three-dimensional orientation of the second portion includes a second Euler angle.

10. The computing device of claim 1, wherein the data indicating the three-dimensional orientation of the first portion includes a first quaternion, and wherein the data indicating the three-dimensional orientation of the second portion includes a second quaternion.

11. The computing device of claim 10, wherein the instructions executable to determine the relative orientation are executable to determine a third quaternion based on the first quaternion and the second quaternion.

12. The computing device of claim 11, wherein determining the relative orientation includes utilizing the offset when determining the third quaternion.

13. On a computing device, a method, comprising:
   receiving data from a first three-dimensional orientation sensor system indicating a three-dimensional orientation of a first portion of the computing device;
   receiving data from a second three-dimensional orientation sensor system indicating a three-dimensional orientation of a second portion of the computing device, the second portion being rotatable relative to the first portion;
   receiving from a sensor an indication that the first portion and the second portion are in a predetermined relative orientation;
   responsive to receiving the indication from the sensor, determining a calibration offset between the data from the first three-dimensional orientation sensor system and the data from the second three-dimensional orientation sensor system;
   determining a relative orientation between the first portion and the second portion based on an offset three-dimensional orientation of the first portion and the three-dimensional orientation of the second portion, the offset three-dimensional orientation of the first portion determined from the three-dimensional orientation of the first portion and the calibration offset; and
   adjusting a function of the computing device based on the relative orientation, wherein adjusting the function of the computing device comprises adjusting a power state of one or both of a first display of the computing device and a second display of the computing device based on the relative orientation.

14. The method of claim 13, wherein adjusting the function of the computing device further includes adjusting an output of one or both of the first display and the second display based on the relative orientation.

15. The method of claim 13, wherein the data indicating the three-dimensional orientation of the first portion includes a first quaternion and the data indicating the three-dimensional orientation of the second portion includes a second quaternion, wherein determining the relative orientation includes determining a third quaternion based on the first quaternion and the second quaternion, and wherein determining the relative orientation includes determining an angle between the first portion and the second portion based on the third quaternion.

16. A computing device, comprising:
   a first portion comprising a first display and a first three-dimensional orientation sensor system;
   a second portion comprising a second display and a second three-dimensional orientation sensor system, the second portion being rotatable relative to the first portion;

a sensor configured to output an indication that the first portion and the second portion are in a predetermined relative orientation;
a logic machine; and
a storage machine holding instructions executable by the logic machine to
- receive from the first three-dimensional orientation sensor system data indicating a three-dimensional orientation of the first portion, and from the second three-dimensional orientation sensor system data indicating a three-dimensional orientation of the second portion;
- receive, from the sensor configured to output the indication that the first portion and the second portion are in the predetermined relative orientation, the indication;
- responsive to receiving the indication from the sensor, determine a calibration offset between the data from the first three-dimensional orientation sensor system and the data from the second three-dimensional orientation sensor system;
- determine a relative orientation between the first portion and the second portion based on an offset three-dimensional orientation of the first portion and the three-dimensional orientation of the second portion, the offset three-dimensional orientation of the first portion determined from the three-dimensional orientation of the first portion and the calibration offset; and
- adjust an output of one or both of the first display and the second display based on the relative orientation.

* * * * *